Patented Dec. 6, 1938

2,139,026

UNITED STATES PATENT OFFICE 2,139,026

METHOD OF PREPARING CATALYST

George L. Matheson, Union, N. J., assignor to Standard Oil Development Company, a corporation of Delaware No Drawing. Application October 22, 1937, Serial No. 170,344

7 Claims. (Cl. 23—237)

This invention relates to catalysts or contact masses used in the conversion of higher boiling hydrocarbons into lower boiling hydrocarbons, and is more particularly concerned with an improved method for preparing them.

Hydrocarbon oils such as heavy naphthas and gas oils may be converted into lower boiling hydrocarbons suitable for motor fuel, and characterized by high octane numbers, by passing the heavier hydrocarbon oil at a temperature of about 850° F. over a catalyst capable of causing splitting or cracking. Purified absorptive clays such as fuller's earth, bentonites, zeolites, etc., are typical of the type of catalyst used. It is preferable to prepare the catalyst in pill, pellet, tablet or other unit form of relatively small dimensions.

One of the chief difficulties with this process is that the catalyst or contact mass becomes coated with coke or tarry matter which gradually reduces its catalytic activity to a point at which no appreciable conversion into high octane number hydrocarbons occurs. It is then necessary to regenerate the catalyst by removing the deposited coke.

Various methods of regenerating the catalyst may be used. The usual method is to pass hot gases containing a small amount of oxygen through the contact mass whereby the coke and carbon are gradually burned out. It is necessary to use large quantities of inert diluents in the gases to remove the heat of combustion in order to keep the catalyst temperature below that which would result in fusion of the catalyst. Gases containing from 1 to 5% $O_2$, and the remainder $CO_2$, steam, or nitrogen are suitable. These gases are heated to a temperature of about 700–800° F. and then passed through the catalyst.

The process, therefore, consists of two distinct operations (1) a conversion period during which hydrocarbon oil is passed through the reactor containing small masses of catalytic material and (2) a regeneration period during which hot gases containing a small amount of oxygen are passed through the reactor.

It can readily be seen that it is highly desirable to increase the length of the conversion cycle and to decrease the duration of the regeneration cycle. Ordinarily, the conversion cycle will last for about 2 hours before the catalyst becomes coked up and the regeneration cycle will require about 2 hours and 40 minutes to 3 or 4 hours, depending upon the method used.

The present invention is directed to a method of preparing the catalytic mass whereby the time required for the regeneration cycle is substantially reduced. This method will be fully understood from the following description.

The absorptive clay or other suitable cracking catalyst is first finely powdered, say to about 200 mesh. A normally solid hydrocarbon such as naphthalene or anthracene is also powdered to about the same mesh. The powdered clay and powdered hydrocarbon are then mixed in the dry state in proportions of about 1 to 20 parts by weight of hydrocarbon to about 99 to 90 parts by weight of clay. In general, the greater the pressure to which the mixture is subjected in the subsequent pilling or extrusion operation, the greater will be the amount of solid hydrocarbon required.

The normally solid organic hydrocarbon mixed with the clay is preferably a cyclic hydrocarbon boiling below about 750° F. and one which can be boiled off from the clay without leaving any products of decomposition.

The dry mixture is now ready for pilling or extruding, or otherwise molding into small compact units.

In pilling, the dry mixture is moistened with about 20% water and is then slugged into 10 to 12 mm. pills. These pills are reground to about 10 mesh and then repilled into about 4 mm. pills. The 4 mm. pills are heated in a reactor with a stream of inert gas such as carbon dioxide or nitrogen to a temperature just high enough to boil off completely all of the solid hydrocarbon originally mixed with the clay without leaving any decomposition products behind. If naphthalene is used as the solid hydrocarbon, the pills are heated to a temperature of about 480° F. If anthracene is used, a temperature of about 750° F. will be necessary.

In extruding, the dry mixture is moistened with about 40 to 50% of water based on the weight of dry mixture. The moistened mass is then forced by pressure through a die and the extruded mass is cut off in suitable lengths, say 3 to 5 mm. The pieces are dried and then heated as above with a stream of inert gas to temperature high enough to boil off completely the normally solid hydrocarbon originally mixed with the clay.

The pills or lumps so prepared are now ready for use and it is found that they have a highly porous structure which so increases the rate of diffusion of gases through them that the time of regeneration can be reduced from 2 hours and 40 minutes to 2 hours or even less, at atmospheric pressure under identical regeneration conditions.

It will be understood that the regeneration may be carried out at atmospheric or superatmospheric pressures, and that at superatmospheric pressures the time for the regeneration is ordinarily less than it is at atmospheric pressure. In all cases, however, no matter what pressure is used, the regeneration time required for catalysts prepared according to the present invention is substantially less than that required for catalysts prepared from the clay alone, when the same pressures are used in each case.

Regeneration of the usual type catalyst is characterized by two distinct stages, (1) rapid burning of the exterior coke either with the gas blow either up or down, (2) slow burning of the coke from the interior of the catalyst. The second stage of slow burning ordinarily requires about double the time of the first stage.

Regeneration of the type of catalyst prepared in accordance with the present invention is not only more rapid than in the case of the usual type catalyst but may be entirely completed in only one stage instead of two.

The following examples illustrate the use of the improved type of catalyst:

Example 1

A West Texas gas oil having an API gravity of 31.3° is passed at the rate of 0.6 vol/vol/hr. through a reactor packed with small pills of catalyst prepared in the manner described above in which 10% naphthalene is mixed with the clay and subsequently boiled off. The temperature in the reactor is maintained at about 850° F. The length of the cracking cycle is 2 hours. After a 2-hour cracking cycle, the catalyst is subjected to a regenerating treatment which consists in passing a gas containing 4% oxygen in steam through the catalyst at a rate of about 3000 vol/vol/hr. at an initial temperature of about 800° F. The regenerating treatment is continued for about 10 to 20 minutes after the maximum temperature in the reactor is reached.

The following table gives the results:

| Cycle No. | Cracking | | Regeneration | |
|---|---|---|---|---|
| | Gravity of overhead (°API) | Conversion per cent gasoline and butane | Time (Min.) | Ignition temp. (°F.) |
| 1 | 41.6 | 37.8 | 120 | 800 |
| 2 | 41.5 | 37.8 | 120 | 800 |
| 3 | 41.8 | 37.8 | 110 | 790 |
| 4 | 40.7 | 37.8 | 90 | 800 |
| 5 | 41.2 | 37.8 | 100 | 800 |
| 6 | 40.7 | 37.8 | 120 | 700 |

Example 2

Another portion of the same West Texas gas oil used in Example 1 is passed at a rate of 0.6 vol/vol/hr. through a reactor filled with pills of a catalyst prepared as in Example 1. The temperature is maintained at about 850° F. and the cracking cycle is 2 hours. Regeneration is carried out with a gas containing 4% oxygen in steam at a rate of about 3000 vol/vol/hr. for the times indicated in the following table:

| Cycle No. | Cracking | | Regeneration | |
|---|---|---|---|---|
| | Gravity of overhead (°API) | Conversion per cent gasoline and butane | Time (Min.) | Ignition temp. (°F.) |
| 1 | 41.6 | 37.8 | 120 | 800 |
| 2-3 | 41.6 | 37.7 | 115 | 800 |
| 4-7 | 40.9 | 36.3 | 100 | 800 |

It will be noted from the above examples that the regeneration cycle with the improved type of catalyst is two hours or less.

Example 3

Another portion of the same West Texas gas oil as used in Examples 1 and 2 is passed through a reactor filled with pills of catalyst prepared in the usual way without the preliminary incorporation of naphthalene. The rate is 0.6 vol/vol/hr. The temperature during the cracking cycle is about 850° F. The cracking cycle is 2 hours. The regeneration is carried out with a gas containing 4% oxygen in nitrogen at a rate of 3000 vol/vol/hr. until the coke is substantially completely burned out. The following table gives the results.

| Cycle No. | Cracking | | Regeneration | |
|---|---|---|---|---|
| | Gravity of overhead (°API) | Conversion per cent gasoline and butane | Time (Min.) | Ignition temp. (°F.) |
| 1-2 | 40.9 | 41.8 | 160 | 900 |
| 3-7 | 41.3 | 41.0 | 160 | 900 |

It will be seen that in Example 3 where no naphthalene is initially incorporated in the catalyst, the time required for regeneration is 160 minutes or about ¾ hour longer than required when the improved type of catalyst is used. Also the ignition temperature is about 100° F. higher than in the case of the improved catalyst.

It will be understood that the length of the regeneration cycle is of extreme importance in the process because it represents a direct loss of capacity. Thus the shorter the regenerating cycle, the less the time lost for cracking. The ignition temperature of the coke deposited on the catalyst is also of importance because high temperatures tend to cause fusing of the catalyst which impairs its activity. Anything which lowers the ignition temperature and shortens the time required for regeneration is of distinct importance and advantage in this type of process.

This invention is not limited by any theories of the mechanism of the reactions nor by any details which have been given merely for purposes of illustration but is limited only in and by the following claims in which it is intended to claim all novelty inherent in the invention.

I claim:

1. The method of preparing a catalytic mass which comprises mixing the catalytic material with a small amount of a normally solid polycyclic hydrocarbon having a boiling point below the temperature at which the catalytic material fuses, molding the mixture into small compact masses, heating the compact masses to a temperature sufficient to boil off the normally solid hydrocarbon without leaving any decomposition products and boiling off substantially all the hydrocarbon.

2. The method of preparing a catalytic mass for use in the conversion of higher boiling hydrocarbons into lower boiling hydrocarbons, which comprises mixing the catalytic material with a small amount of a normally solid polycyclic hydrocarbon having a boiling point below the temperature at which the catalytic material fuses, molding the mixture into small compact masses, heating the masses in an inert gas to a temperature high enough to boil off substantially all of the normally solid polycyclic hydrocarbon but below the temperature at which the catalytic material fuses and boiling off substantially all the hydrocarbon.

3. The method of preparing a catalytic mass for use in the conversion of higher boiling hydrocarbons into lower boiling hydrocarbons, which comprises mixing the finely divided catalytic material with a small amount of a finely divided normally solid polycyclic hydrocarbon boiling below about 750° F., moistening the mixture with a small amount of water, molding the moistened powder into small compact masses, heating the compact masses to a temperature sufficient to volatilize substantially all of the normally solid hydrocarbon without leaving any decomposition products on the catalyst and boiling off substantially all the hydrocarbon.

4. Method according to claim 3 in which the normally solid polycyclic hydrocarbon is naphthalene.

5. Method according to claim 3 in which the normally solid hydrocarbon is anthracene.

6. The method of preparing a catalytic mass for use in the conversion of higher boiling hydrocarbons into lower boiling hydrocarbons, which comprises powdering an absorptive clay to about 200 mesh, adding thereto from 1 to 20 parts by weight of a powdered normally solid polycyclic hydrocarbon boiling below about 750° F., moistening the mixed powder with a small amount of water, molding the moistened powder into small compact masses, heating the compact masses to a temperature sufficient to volatilize substantially all of the normally solid hydrocarbon, but insufficient to cause fusion of the absorptive clay and boiling off substantially all the hydrocarbon.

7. The method of preparing a catalytic mass for use in the conversion of higher boiling hydrocarbons into lower boiling hydrocarbons, which comprises powdering an absorptive clay, mixing therewith from 1 to 20 parts by weight of naphthalene, moistening the mixture with about 20% of water, slugging the moistened mixture into pills of about 10 mm., regrinding the pills to about 10 mesh and then repilling into pills of about 4 mm., and boiling off substantially all of the naphthalene by heating the pills to a temperature of about 480° F.

GEORGE L. MATHESON.